United States Patent
Hamada et al.

(10) Patent No.: US 10,550,891 B2
(45) Date of Patent: Feb. 4, 2020

(54) SEAL MEMBER FOR ROLLING BEARING AND ROLLING BEARING ASSEMBLY

(71) Applicant: JTEKT CORPORATION, Osaka-shi, Osaka (JP)

(72) Inventors: Kazuki Hamada, Kashiwara (JP); Yuta Sugaya, Itano-gun (JP); Yuka Sato, Toyonaka (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 16/075,022

(22) PCT Filed: Feb. 2, 2017

(86) PCT No.: PCT/JP2017/003720
§ 371 (c)(1),
(2) Date: Aug. 2, 2018

(87) PCT Pub. No.: WO2017/135352
PCT Pub. Date: Aug. 10, 2017

(65) Prior Publication Data
US 2019/0055989 A1    Feb. 21, 2019

(30) Foreign Application Priority Data

Feb. 2, 2016   (JP) ................................. 2016-017777
May 2, 2016   (JP) ................................. 2016-092398

(51) Int. Cl.
*F16C 33/78*   (2006.01)
*F16C 19/38*   (2006.01)
(Continued)

(52) U.S. Cl.
CPC ........ *F16C 33/7853* (2013.01); *F16C 19/388* (2013.01); *F16C 33/768* (2013.01); *F16C 33/7813* (2013.01); *F16J 15/3232* (2013.01)

(58) Field of Classification Search
CPC ........ F16C 19/38; F16C 19/388; F16C 19/52; F16C 33/60; F16C 33/726; F16C 33/768;
(Continued)

(56) References Cited

U.S. PATENT DOCUMENTS 4,692,040 A * 9/1987 Ebaugh .................. B21B 31/07
                                                277/551
5,118,206 A * 6/1992 Otto ...................... F16C 19/385
                                                384/477

(Continued)

FOREIGN PATENT DOCUMENTS

CN    203717637 U    7/2014
CN    103987976 A    8/2014
(Continued)

OTHER PUBLICATIONS

Apr. 18, 2017 International Search Report issued in International Patent Application No. PCT/JP2017/003720.
(Continued)

*Primary Examiner* — Marcus Charles
(74) *Attorney, Agent, or Firm* — Oliff PLC (57) ABSTRACT

A rolling bearing has a pair of inner rings and an annular groove provided on an outer circumference of a portion where end portions of the pair of inner rings abut against each other. A seal member for a rolling bearing has an elastic portion. The seal member for a rolling bearing is mounted in the annular groove. The elastic portion has an annular proximal end portion that is fixed to one axial end side of the annular groove and an annular extending portion extending from the proximal end portion towards the other axial end side and having on an inner circumference thereof a sliding contact lip configured to be brought into sliding contact with the other axial end side of the annular groove.

8 Claims, 7 Drawing Sheets

(51) Int. Cl.
*F16J 15/32* (2016.01)
*F16J 15/3232* (2016.01)
*F16C 33/76* (2006.01)

(58) Field of Classification Search
CPC .. F16C 33/78; F16C 33/7813; F16C 33/7853; F16J 15/3232
USPC ......... 384/477–478, 484–486, 571; 277/644, 277/648, 651, 928, 590, 637, 616
See application file for complete search history.

(56) References Cited

U.S. PATENT DOCUMENTS

| | | | | |
|---|---|---|---|---|
| 5,213,342 A | * | 5/1993 | Weber | F16C 33/768 |
| | | | | 267/1.5 |
| 5,362,159 A | * | 11/1994 | Kufner | F16C 13/02 |
| | | | | 384/484 |
| 6,345,914 B1 | * | 2/2002 | Kondo | F16C 19/388 |
| | | | | 384/477 |
| 6,457,870 B2 | * | 10/2002 | Aizawa | F16C 19/388 |
| | | | | 384/477 |
| 8,226,298 B2 | * | 7/2012 | Hosaka | F16C 19/388 |
| | | | | 384/477 |
| 2001/0002939 A1 | | 6/2001 | Aizawa et al. | |
| 2009/0257699 A1 | | 10/2009 | Hosaka et al. | |
| 2015/0117805 A1 | | 4/2015 | Takayama et al. | |
| 2016/0010692 A1 | | 1/2016 | Yonekura | |

FOREIGN PATENT DOCUMENTS

| | | | | |
|---|---|---|---|---|
| CN | 105257709 A | | 1/2016 | |
| JP | 11254010 A | * | 9/1999 | ............ F16C 19/388 |
| JP | 2000-104747 A | | 4/2000 | |
| JP | 2002178013 A | * | 6/2002 | ............ F16C 33/768 |
| JP | 2007-092790 A | | 4/2007 | |
| JP | 2008-106824 A | | 5/2008 | |

OTHER PUBLICATIONS

Apr. 18, 2017 Written Opinion of the International Searching Authority issued in International Patent Application No. PCT/JP2017/003720.

Nov. 5, 2019 Office Action issued in Chinese Application No. 201780009563.9

\* cited by examiner

SEAL MEMBER FOR ROLLING BEARING AND ROLLING BEARING ASSEMBLY

CROSS REFERENCE TO RELATED APPLICATIONS

This application is the U.S. National Phase of PCT/JP2017/003720 filed Feb. 2, 2017, which claims priority to JP 2016-017777 filed Feb. 2, 2016 and JP 2016-092398 filed May 2, 2016, the entire disclosure of which is incorporated herein by reference.

TECHNICAL FIELD

The present invention relates to a seal member for a rolling bearing and a rolling bearing assembly.

BACKGROUND ART

Figure 7:
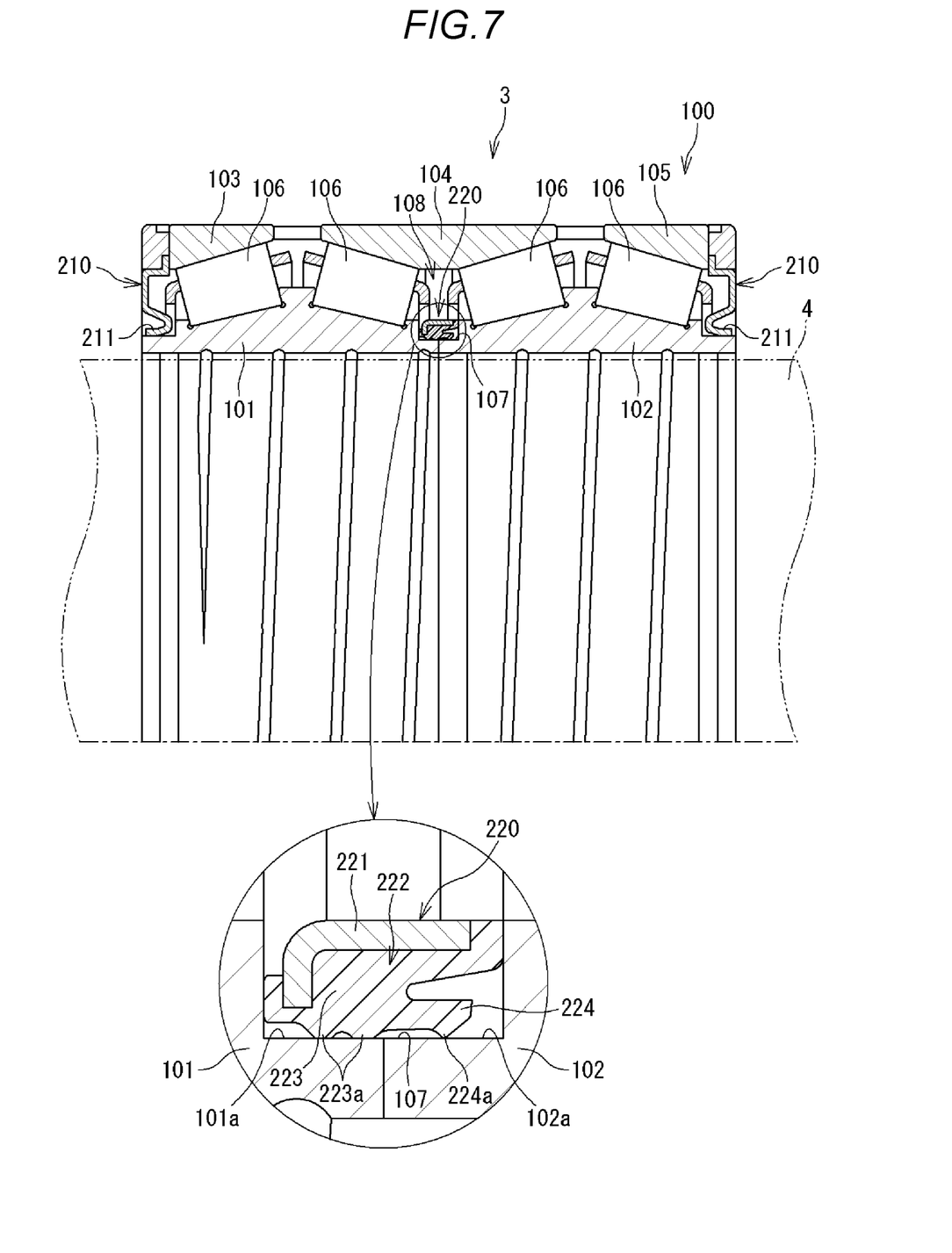
FIG. 7 is a sectional view illustrating a conventional rolling bearing assembly.

Patent Document 1 discloses a rolling bearing assembly. A rolling roll of a rolling mill is supported by the rolling bearing assembly. The rolling bearing assembly includes a rolling bearing and a seal member. In the rolling bearing assembly of Patent Document 1, as shown in FIG. 7, a rolling bearing assembly 3 includes a rolling bearing 100 and first and second seal members 210, 220 that are mounted on this rolling bearing 100. A roll neck 4 of the rolling roll is supported rotatably about a horizontal axis via the rolling bearing 100.

The rolling bearing 100 includes a pair of first and second inner rings 101, 102 that are fitted on the roll neck 4, a plurality of first to third outer rings 103 to 105 that are fixed to a housing, and a plurality of tapered rollers 106 that are disposed in an annular space defined between the inner rings 101, 102 and the outer rings 103 to 105. The first and second inner rings 101, 102 are disposed so that one axial end portion of the first inner ring 101 and the other axial end portion of the second inner ring 102 abut against each other. Then, an annular groove 107 is provided on outer circumferences of portions of the first and second inner rings 101, 102 where the axial end portions thereof abut against each other. This annular groove 107 is formed by providing steps at the end portions of the first and second inner rings 101, 102.

A bearing seal 210 as the first seal member is mounted at each of axial sides of the rolling bearing 100. The bearing seal 210 has a lip portion 211 that is brought into sliding contact with an outer circumferential surface of each of the inner rings 101, 102. The bearing seal 210 prevents cooling water for cooling the rolling roll or a foreign matter from entering into the annular space 108 from a bearing external portion.

An inter-inner ring seal 220 as the second seal member is mounted in the annular groove 107 that is situated at an axially central portion of the rolling bearing 100.

The inter-inner ring seal 220 is made of an annular core metal portion 221 and an elastic portion 222 that is fixed to this core metal portion 221. The elastic portion 222 has a proximal end portion 223 that includes on an inner circumferential surface thereof a pair of fixing lips 223a that fit on a circumferential surface of the annular groove 107 that corresponds to the first inner ring 101, and an extending portion 224 that includes on an inner circumferential surface thereof a sliding contact lip 224a that is brought into contact with a circumferential surface of the annular groove 107 that corresponds to the second inner ring 102. The sliding contact lip 224a is designed to slide relative to the circumferential surface of the annular groove 107 that corresponds to the second inner ring 102 when the first ring 101 and the second inner ring 102 rotate relative to each other.

The inter-inner ring seal 220 prevents cooling water or rolling oil that passes between the abutting end portions of the first and second inner rings 101, 102 from an outer circumferential surface of the roll neck 4 to enter the annular groove 107 from entering the annular space 108 or grease inside the annular space 108 from leaking out of the annular space 108.

PRIOR ART DOCUMENT

Patent Document

Patent Document 1: JP-A-2008-106824

In the rolling bearing assembly of Patent Document 1, the rolling roll 4 of the rolling mill is supported by the rolling bearing assembly 3. While the rolling mill is in operation, an internal temperature of the rolling bearing 100 increases, while the internal temperature of the rolling bearing 100 decreases when the rolling mill is stopped. When the internal temperature of the rolling bearing 100 decreases, an internal pressure of the rolling bearing 100 decreases, whereby a negative pressure is generated in the annular space 108 from time to time. As this occurs, when the rolling mill is caused to start operating again with the negative pressure remaining in the annular space 108, an excessive increase in temperature is generated in the bearing seals 210 due to the lip portions 211 being kept sticking to the corresponding inner rings through suction, whereby an early failure of the bearing seals 210 may be caused from time to time. Additionally, cooling water outside the rolling bearing 100 may enter an inside of the annular space 108 from sliding contact portions between the lip portions 211 of the bearing seals 210 and outer circumferential surfaces of the inner rings 101, 102 from time to time by virtue of a sucking action caused by the negative pressure.

To deal with this problem, in a case where as the inter-inner ring seal, the inter-inner ring seal 220 is used which has the extending portion 224 including the sliding contact lip 224a that is brought into contact with the outer circumferential surface of the inner ring 102 along a full circumference thereof as shown in FIG. 7, when a negative pressure is generated in the annular space 108 as a result of a reduction in internal pressure of the rolling bearing 100, the sliding lip 224a separates radially outwards from a bottom portion of the annular groove 107 provided on the outer circumferential surface of the inner ring 102, thereby making it possible to eliminate the negative pressure inside the annular space 108.

On the other hand, in mounting the inter-inner ring seal 220 in the rolling bearing, normally, the inter-inner ring seal 220 is mounted on the rolling bearing 100 by following a procedure that will be described below.

Namely, the extending portion 224 of the inter-inner ring seal 220 is fitted on the step portion at the end portion of the second inner ring 102, whereafter, the step portion at the end portion of the first inner ring 101 is fitted in the proximal end portion 223 of the inter-inner ring seal 220 so that an end face of the first inner ring 101 and an end face of the second inner ring 102 abut against each other, whereby the inter-inner ring seal 220 is mounted in the annular groove 107.

In the case where the inter-inner ring seal 220 is mounted in the rolling bearing 100 in this way, when the extending portion 224 of the inter-inner ring seal 220 is fitted on the step portion at the end portion of the second inner ring 102, part of the extending portion 224 is kept turned up. Additionally, in the case where the step portion at the end portion of the second inner ring 102 is fitted in the extending portion 224 of the inter-inner ring seal 220 so that the end face of the first inner ring 101 and the end face of the second inner ring 102 abut against each other after the proximal end portion 223 of the inter-inner ring seal 220 is erroneously fitted on the step portion at the end portion of the first inner ring 101 at the time of assemblage, a part of the extending portion 224 is deformed to be caught between the first inner ring 101 and the second inner ring 102. Due to this, the inter-inner ring seal 220 having the thin extending portion along the full circumference thereof becomes inferior in relation to assemblage into the rolling bearing 100.

SUMMARY OF THE INVENTION

According to an embodiment of the invention, there is provided a seal member for a rolling bearing that is superior in relation to assemblage into the rolling bearing while having a function to eliminate a negative pressure when such a negative pressure is generated in an interior of the rolling bearing and a rolling bearing assembly including this seal member.

According to the embodiment of the invention, the seal member for a rolling bearing (hereinafter, may be referred to simply as a seal member in this description) is used in a rolling bearing having a pair of inner rings fitted on a rotational shaft in such a state that axial end portions abut against each other, an outer ring disposed radially outwards of the pair of inner rings, and an annular groove provided on an outer circumference of a portion where the end portions of the pair of inner rings abut against each other.

The seal member has an annular elastic portion made of an elastic material.

The seal member is mounted in the annular groove.

The elastic portion has an annular proximal end portion that is fixed to one axial end side of the annular groove and an annular extending portion extending from the proximal end portion towards the other axial end side and having on an inner circumference thereof a sliding contact lip configured to be brought into sliding contact with the other axial end side of the annular groove.

The extending portion has along a circumferential direction a thin portion whose radial thickness is smaller than that of the proximal end portion and which deforms radially outwards by virtue of a negative pressure generated in an interior of the rolling bearing to possibly cause the sliding contact lip to separate from the annular groove and a thick portion whose radial thickness is greater than that of the thin portion. The thin portion and the thick portion are disposed alternately.

A distal end portion of the thick portion on the other axial end side projects further towards the other axial end side than a distal end portion of the thin portion on the other axial end side.

The seal member has the annular extending portion having on the inner circumference thereof the sliding contact lip that is brought into sliding contact with the annular groove provided on the rolling bearing. The extending portion has the thin portion that deforms radially outwards by virtue of a negative pressure generated in the interior of the rolling bearing to possibly cause the sliding contact lip to separate from the annular groove. Due to this, in a rolling bearing assembly in which the seal member is mounted, when a negative pressure is generated in the interior of the rolling bearing, the sliding contact lip separates from the annular groove, and air flows into the interior of the rolling bearing from a gap generated between the sliding contact lip and the annular groove, whereby the negative pressure in the interior of the rolling bearing can be eliminated.

Additionally, the extending portion also has the thick portion that is disposed alternately with the thin portion and whose radial thickness is greater than that of the thin portion to thereby get more difficult to be deformed than the thin portion. Due to this, the seal member is made difficult to be deformed when the seal member is mounted in the rolling bearing. Thus, there is caused no such situation that part of the extending portion is kept turned up or that part of the extending portion is deformed to be caught between the end portions of the pair of inner rings that are caused to abut against each other when the seal member is mounted in the rolling bearing. Thus, the seal member is superior in relation to assemblage into the rolling bearing. The distal end portion of the thick portion on the other axial end side projects further towards the other axial end side than the distal end portion of the thin portion on the other axial end side. Then, in mounting the seal member on the end portions of the inner rings of the rolling bearing, the distal end portion of the thick portion on the other axial end side comes into contact with the end portions of the inner rings.

Thus, when a negative pressure is generated in the interior of the rolling bearing, the seal member can eliminate the negative pressure and is superior in relation to assemblage into the rolling bearing.

In the seal member, the extending portion may have a recess portion that opens at the other axial end side and whose depth direction follows an axial direction, and the thin portion may be provided radially inwards of the recess portion.

As this occurs, when a negative pressure is generated in the interior of the rolling bearing, the thin portion easily deforms radially outwards, whereby the sliding contact lip easily separates from the annular groove.

In the extending portion, a sum of circumferential lengths of the thin portion may be longer than a sum of circumferential length of the thick portion.

As this occurs, since a ratio of a portion occupied by the thin portion that easily deforms in the extending portion increases, the sliding contact lip becomes easy to separate from the annular groove when a negative pressure is generated in the interior of the rolling bearing, thereby making it possible to eliminate the negative pressure in the interior of the rolling bearing more efficiently.

In the extending portion, a sum of circumferential lengths of the thin portion may be shorter than a sum of circumferential length of the thick portion.

Since a ratio of a portion occupied by the thick portion that is made more difficult to be deformed than the thin portion increases in the extending portion, the assemblage performance of the seal member can be improved when the seal member is mounted in the rolling bearing.

In the seal member, the distal end portion of the thick portion may have a first sloping surface that comes to separate farther away from a bottom surface of the annular groove as the first sloping surface extends towards the other axial end side on a radially inner portion of the distal end portion.

The distal end portion of the thin portion may have a second sloping surface that comes to separate farther away from the bottom surface of the annular groove as the second sloping surface extends towards the other axial end side on a radially inner portion of the distal end portion.

An angle formed by the first sloping surface and the bottom surface of the annular groove may be equal to or smaller than an angle formed by the second sloping surface and the bottom surface of the annular groove. As this occurs, since the angle formed by the first sloping surface of the distal end portion of the thick portion is equal to or smaller than the angle formed by the second sloping surface of the distal end portion of the thin portion and the bottom surface of the annular groove, in mounting the seal member on the end portions of the inner rings of the rolling bearing, the first sloping surface of the distal end portion of the thick portion comes into contact with the end portions of the inner rings before the second sloping surface of the distal end portion of the thin portion comes into contact with the end portions of the inner rings to thereby function as a guide when mounting the seal member on the end portions of the inner rings. Thus, the seal member can be mounted on the end portions of the inner rings of the rolling bearing more smoothly.

In the seal member, a boundary portion between the thin portion and the proximal end portion may be situated nearer to the one axial end side than an abutting plane where the end portions of the pair of inner rings abut against each other.

This enables an axial length of the thin portion to be longer, the thin portion can be shaped so as to deform easily radially outwards to eliminate a negative pressure generated in the interior of the rolling bearing.

According to an embodiment of the invention, a rolling bearing assembly has a rolling bearing and a seal member. The rolling bearing has an outer ring, an inner ring including a first inner ring and a second inner ring whose axial end portions are caused to abut against each other, and a rolling element disposed between the outer ring and the inner ring. An annular groove is provided on an outer circumferential surface of a portion where the first inner ring and the second inner ring are caused to abut against each other. The seal member is mounted in the annular groove.

In the rolling bearing assembly, since the seal member of the invention is mounted in the annular groove provided on the outer circumferential surface of the inner ring, the sliding contact lip of the seal member separates from the annular groove when a negative pressure is generated in the interior of the rolling bearing to thereby eliminate the negative pressure.

Additionally, with the rolling bearing assembly, there is no such situation at the time of assemblage that part caused of the extending portion is kept turned up or is caught in the portion where end portions of the first inner ring and the second inner ring are caused to abut against each other.

According to the embodiment of the invention, it is possible to provide the seal member that can eliminate negative pressure when such negative pressure is generated in the interior of the rolling bearing and which is superior in relation to assemblage into the rolling bearing when the seal member is mounted and the rolling bearing assembly having the seal member mounted therein.

MODE FOR CARRYING OUT THE INVENTION

Hereinafter, embodiments of the invention will be described in detail by reference to accompanying drawings.

First Embodiment

Figure 1:
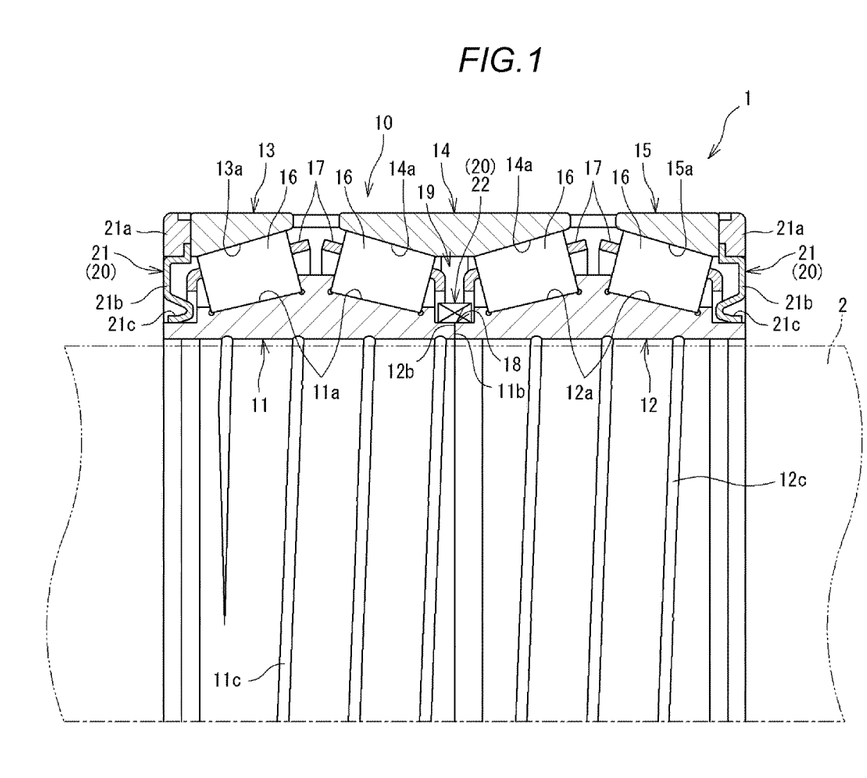
FIG. 1 is an axial sectional view of a rolling bearing assembly according to a first embodiment.
Figure 2:
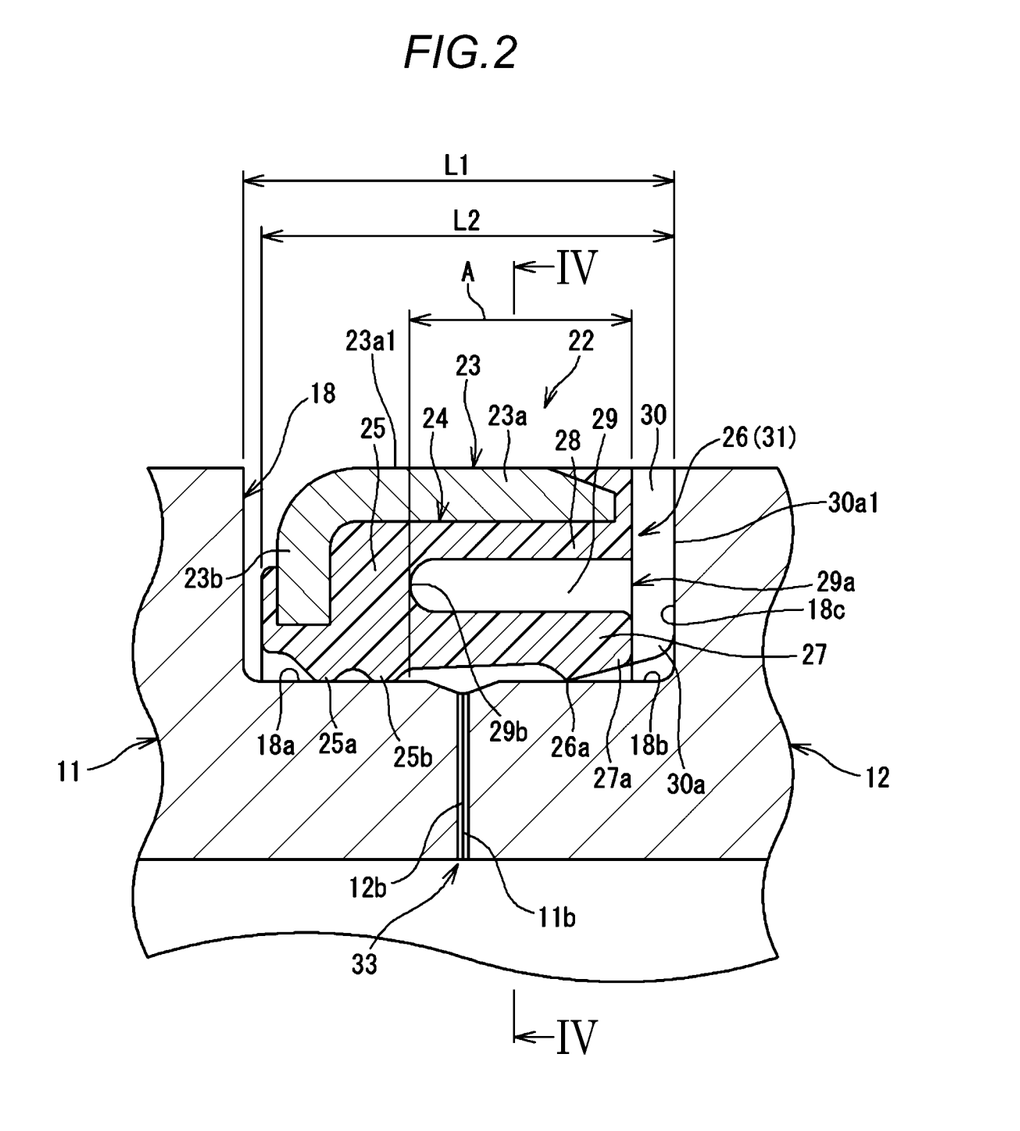
FIG. 2 is an axial sectional view illustrating a seal member according to the first embodiment mounted in the rolling bearing assembly illustrated in FIG. 1 and a periphery of the seal member, taken along a line II-II in FIG. 4.
Figure 3:
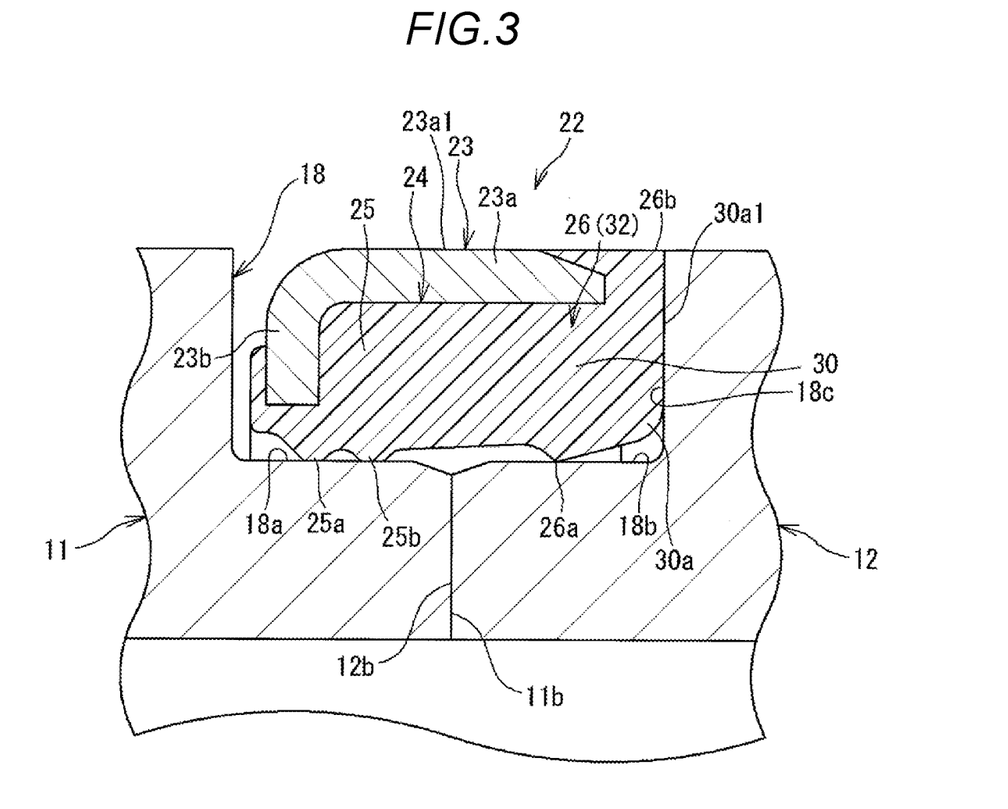
FIG. 3 is an axial sectional view illustrating the seal member according to the first embodiment mounted in the rolling bearing assembly illustrated in FIG. 1 and a periphery of the seal member, taken along a line III-III in FIG. 4.
Figure 4:
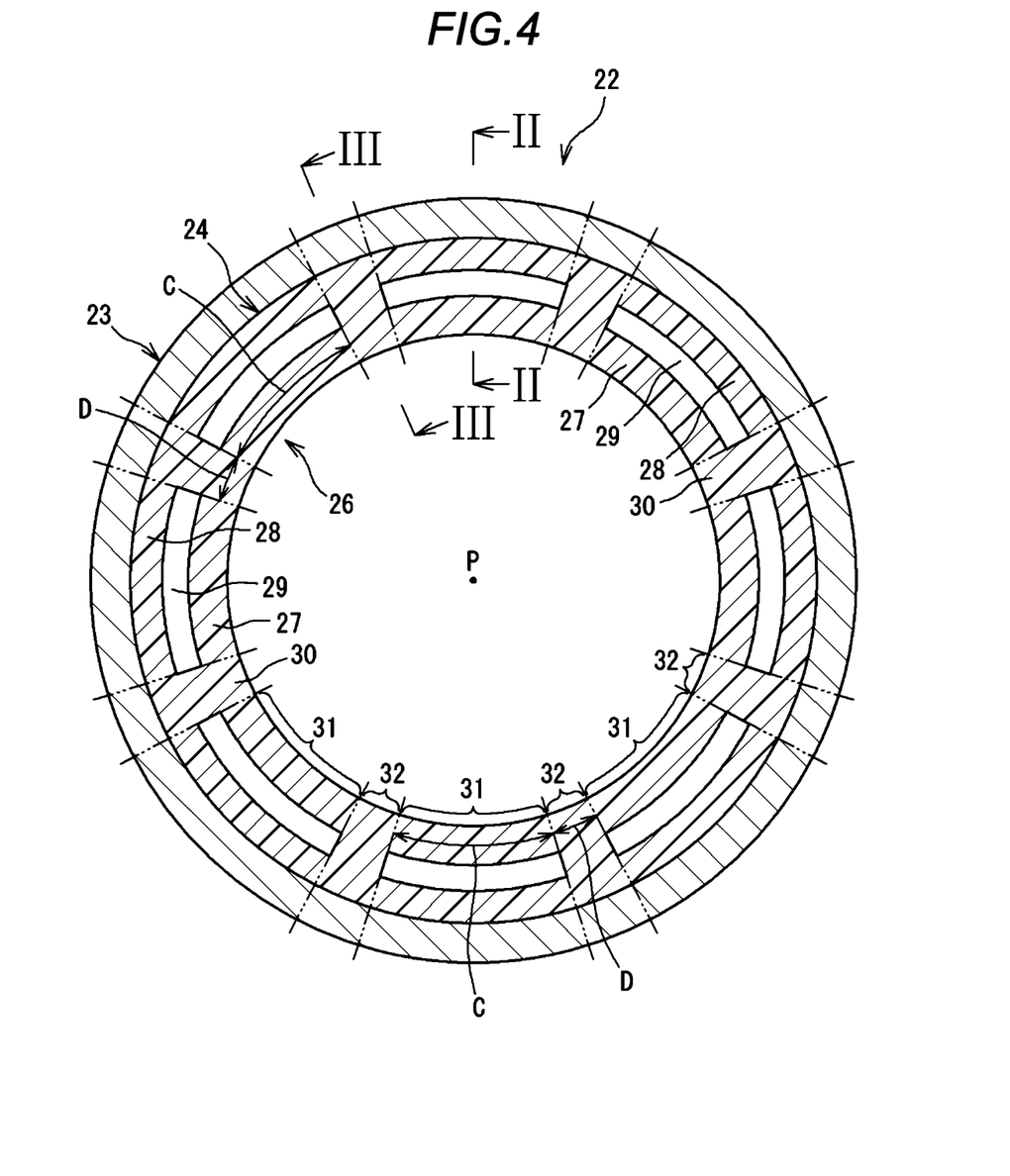
FIG. 4 is an end view of the seal member illustrated in FIG. 2, taken along a line IV-IV in FIG. 2.

FIG. 1 is an axial sectional view of a rolling bearing assembly according to a first embodiment. FIGS. 2 and 3 are both axial sectional views illustrating a seal member according to the first embodiment mounted in the rolling bearing assembly illustrated in FIG. 1 and a periphery of the seal member. FIG. 2 is taken along a line II-II in FIG. 4, and FIG. 3 is taken along a line III-III in FIG. 4. FIG. 4 is an end view of the seam member illustrated in FIG. 2 taken along a line IV-IV in FIG. 2.

<Rolling Bearing Assembly>

As FIG. 1 illustrates, a rolling bearing assembly 1 supports rotatably, for example, a roll neck (a rotational shaft) 2 of a rolling roll and includes a rolling bearing 10 and a seal member 20 configured to seal up a bearing interior of the rolling bearing 10. The rolling roll is cooled by jetted cooling water.

Hereinafter, in this description, a side (or a direction) from an interior towards an exterior of the rolling bearing 10 is referred to as an axially outer side (or an axially outward direction), and a side from the exterior towards the interior of the rolling bearing 10 is referred to as an axially inner side.

<Rolling Bearing>

The rolling bearing 10 is made up of, for example, four lines or columns of tapered roller bearings. The rolling bearing 10 includes a first and second inner rings 11, 12 that are disposed in an axial direction as a pair, three, that is, a first to third outer rings 13 to 15 that are disposed in the axial direction, a plurality of tapered rollers (rolling elements) 16 that are disposed for each of the four columns, and four cages 17.

The first and second inner rings 11, 12 are fitted on the roll neck 2 in such a state that axially inner end portions 11b, 12b thereof abut against each other. Two inner ring raceways 11a, 12a are formed in the axial direction on each of outer circumferential surfaces of the inner rings 11, 12. Spiral lubricating grooves 11c, 12c are formed on inner circumferential surfaces of the inner rings 11, 12, respectively, so as to accommodate grease that is a lubricant for preventing the seizure of the inner circumferential surfaces.

An annular groove 18 is formed on an outer circumference of portions of both the inner rings 11, 12 where the end portions 11b, 12b abut against each other in such a way as to straddle both the inner rings 11, 12. A bottom surface of the annular groove 18 has a first circumferential surface 18a formed on the first inner ring 11 side and a second circumferential surface 18b formed on the second inner ring 12 side (refer to FIG. 2).

A plurality of through holes 33 (refer to FIG. 2) are provided at predetermined intervals in a circumferential direction at the portions of the inner rings 11, 12 where the end portions 11b, 12b abut against each other so as to penetrate radially the portions where the end portions of the inner rings abut against each other. Air can be introduced efficiently into an annular space 19 formed between the first and second inner rings 11, 12 and the first to third outer rings 13 to 15 by way of the through holes 33 or air inside the annular space 19 can be discharged therefrom by way of the through holes 33 efficiently.

An uneven force is exerted frequently on the roll neck 2 in an axial direction as a result of a passage of rolled material, and this generates a difference in circumferential speed between the first inner ring 11 and the second inner ring 12, resulting in a case where the first inner ring 11 and the second inner ring 12 rotate relatively. Due to this, the second circumferential surface 18b and the first circumferential surface 18a of the annular groove 18 are made to rotate relatively.

The first to third outer rings 13 to 15 are fitted in an inner circumferential surface of a housing (whose illustration is omitted) of the rolling roll in a position lying radially outwards of the inner rings 11, 12. One outer ring raceway 13a, 15a is formed on each of inner circumferential surfaces of the first and third outer rings 13, 15. Two outer ring raceways 14a are formed in the axial direction on an inner circumference of the second outer ring 14.

The tapered rollers 16 are disposed to roll between the inner ring raceways 11a, 12a of the inner rings 11, 12 and the outer ring raceways 13a to 15a of the outer rings 13 to 15 and in a plurality of columns (here, four columns).

The cages 17 hold circumferential spaces between the columns of tapered rollers 16.

<Seal Member>

The rolling bearing assembly 1 includes, as the seal member 20, a pair of bearing seals 21 that are mounted individually at both axial end portions of the rolling bearing 10 and an inter-inner ring seal 22 that is mounted in the annular groove 18 situated as an axially central portion of the rolling bearing 10. Here, the inter-inner ring seal 22 constitutes a seal member of the embodiment of the invention.

The bearing seals 21 seal up both axial ends of the annular space 19 that the rolling bearing 10 possesses.

The bearing seal 21 has an annular cover 21a that is fixed to an axially outer end face of the first outer ring 13 (the third outer ring 15) and an annular seal 21b that is fixed to an inner circumference of the cover 21a. The seal 21b is made of an elastic material such as a synthetic rubber, and a lip portion 21c is formed at an inner circumferential end portion of the seal 21 so as to be brought into sliding contact with an axially outward outer circumferential surface of the first inner ring 11 (the second inner ring 12). By adopting this configuration, the bearing seal 21 acts to prevent cooling water from entering the annular space 19 from an axially outer side of the rolling bearing 10.

As FIGS. 2 and 3 illustrate, the inter-inner ring seal 22 has an annular core metal 23 that is formed into an L-shape in section and an annular elastic portion 24 that is fixed to the core metal 23.

The core metal 23 is made up of, for example, a metallic annular member and has a cylindrical portion 23a, and a annular plate portion 23b that is bent radially inwards from an axial end portion of the cylindrical portion 23a.

The elastic portion 24 is formed of an elastic material such a synthetic rubber and is fixed to the core metal 23 through vulcanized adhesion, baking or the like. The elastic portion 24 is situated further radially inwards than an outer circumferential surface 23a1 of the cylindrical portion 23a of the core metal 23.

FIG. 2 is the sectional view taken along the line II-II in FIG. 4, and FIG. 3 is the sectional view taken along the line III-III in FIG. 4.

The elastic portion 24 has an annular proximal end portion 25 that is provided on the first inner ring 11 side and an extending portion 26 that extends from the proximal end portion 25 towards the second inner ring 12 side. The extending portion 26 extends as far as the vicinity of a side surface 18c of the annular groove 18 that lies on the second inner ring 12.

A first fixing lip 25a and a second fixing lip 25b that lies adjacent to the first fixing lip 25a in the axial direction are provided on an inner circumferential surface of the proximal end portion 25. The first and second fixing lips 25a, 25b are left in contact with the first circumferential surface 18a.

The first and second fixing lips 25a, 25b are fitted on the first circumferential surface 18a with a predetermined interference and are prevented from moving relatively to the first circumferential surface 18a by virtue of tension generated by the interference fit. This allows the inter-inner ring seal 22 to be mounted on the first inner ring 11 so as to rotate together with the first inner ring 11.

A sliding contact lip 26a is provided on an inner circumferential surface of the extending portion 26. The sliding contact lip 26a is left in contact with the second inner circumferential surface 18b.

The sliding contact lip 26a is left in contact with the second circumferential surface 18b with tension that is lower than the tension with which the first and second fixing lips 25a, 25b are fitted on the first circumferential surface 18a. Due to this, when the first inner ring 11 and the second inner ring 12 rotate relatively, the sliding contact lip 26a is made to slide on the second inner circumferential surface 18b of the annular groove 18 while kept in contact with the second inner circumferential surface 18b. Namely, the inter-inner ring seal 22 can slide relative to the second inner ring 12.

In addition, a plurality of projecting portions 26b are provided at predetermined intervals in a circumferential direction on an outer circumferential side of an outer end face of the extending portion 26 so as to project therefrom, and these projecting portions 26b are brought into surface contact with the side surface 18c of the annular groove 18 in such a way as to be allowed to slide on the side surface 18c on the second inner ring 12 side while being kept in contact therewith.

As FIG. 4 illustrates, on the annular extending portion 26, a recess portion forming area 31 and a non-recess portion forming area 32 are disposed alternately along a circumferential direction. On the extending portion 26, eight recess portion forming areas 31 and eight non-recess portion forming areas 32 are disposed alternately with each other.

As FIG. 2 illustrates, the recess portion forming area 31 has an inner thin portion 27 and an outer thin portion 28 that extends from the proximal end portion 25 towards the second inner ring 12 side. Radial thicknesses of the inner thin portion 27 and the outer thin portion 28 are smaller than that of the proximal end portion 25. The sliding contact lip 26a is provided on an inner circumferential surface of the inner thin portion 27. The outer thin portion 28 is situated radially outwards of the inner thin portion 27 with a space defined therebetween.

In the recess portion forming area 31, a recess portion 29 is provided radially outwards of the inner thin portion 27, and this recess portion 29 is surrounded by the inner thin portion 27, the proximal end portion 25, the outer thin portion 28 and a thick portion 30 (refer to FIGS. 3 and 4) of the non-recess portion forming area 32. The recess portion 29 constitutes a recess portion that has an opening portion 29a at a second inner ring 12 side of the extending portion 26 and whose depth direction follows the axial direction. A bottom 29b of the recess portion 29 is situated nearer to the first inner ring 11 than an abutting plane where the end portion 11b of the first inner ring 11 and the end portion 12b of the second inner ring 12 abut against each other.

As FIG. 4 illustrates, a shape of the opening portion 29a of the recess portion 29 is a circular arc shape that is curved along the circumferential direction. The numbers of recess portion forming areas 31 and non-recess portion forming areas 32 are not limited to eight but can be seven or smaller or nine or greater.

Since the recess portion forming area 31 includes the recess portion 29, the inner thin portion 27 that is situated radially inwards of the recess portion 29 can easily deform radially outwards. This allows the sliding contact lip 26a provided on the inner circumference of the inner thin portion can separate radially outwards from the second circumferential surface 18b of the annular groove 18 when a negative pressure is generated inside the annular space 19 in the rolling bearing 10 to thereby eliminate the negative pressure inside the annular space 19.

In the recess portion forming area 31, a boundary portion between the inner thin portion 27 and the proximal end portion 25 is situated nearer to the first inner ring 11 than the abutting plane where the end portion 11b of the first inner ring 11 and the end portion 12b of the second inner ring 12 abut against each other. Due to this, an axial length (denoted by A in FIG. 2) of the inner thin portion 27 becomes longer than when the boundary portion is situated nearer to the second inner ring 12 than the abutting plane. When a negative pressure is generated in the interior of the rolling bearing 10, the inner thin portion 27 having the long axial length easily deforms in a direction in which the sliding contact lip 26a separates from the second circumferential surface (in a radially outward direction). Due to this, the inter-inner ring seal 22 including the inner thin portion 27 is suitable for eliminating a negative pressure inside the annular space 19.

As FIG. 3 illustrates, the non-recess portion forming area 32 of the extending portion 26 has the thick portion 30 that extends from the proximal end portion 25 towards the second inner ring 12. A radial thickness of the thick portion 30 is almost equal to that of the proximal end portion 25. The sliding contact lip 26a is provided on an inner circumferential surface of the thick portion 30.

Namely, the non-recess portion forming area 32 has a configuration where the recess portion 29 of the recess portion forming area 31 is closed and has a similar configuration to that of the recess portion forming area 31 excluding the fact that the non-recess portion forming area 32 is made up of the thick portion 30 as a whole.

Due to this, the non-recess portion forming area 32 is more difficult to deform than the recess portion forming area 31, and the sliding contact lip 26a provided on the inner circumferential surface of the thick portion 30 is made difficult to separate from the second circumferential surface 18b.

In addition, in this embodiment, a distal end portion 30a of the thick portion 30 on the other axial end side (a right-hand side in FIGS. 2 and 3) projects further towards the other axial end side than a distal end portion 27a of the inner thin portion 27 on the other axial end side. Due to this, in mounting the inter-inner ring seal 22, which is the seal member, on the end portions of the inner rings of the rolling bearing 10, the distal end portion 30a of the thick portion 30 on the other axial end side is brought into contact with the end portions of the inner rings.

The inter-inner ring seal 22 can eliminate a negative pressure generated inside the annular space 19 of the rolling bearing 10 by the existence of the recess portion forming area 31 including the inner thin portion 27 that can easily deform radially inwards by a negative pressure generated in the interior of the rolling bearing 10. The inter-inner ring seal 22 can avoid the occurrence of such a situation that the inter-inner ring seal 22 is deformed when the inter-inner ring seal 22 is mounted in the rolling bearing 10 whereby part of the extending portion 26 is left turned up or is caught between the end portions 11b, 12b of the first and second inner rings 11, 12 by the existence of the non-recess portion forming area 32 that is more difficult to deform than the recess portion forming area 31.

Further, when the inter-inner ring seal 22 is mounted in the rolling bearing 10, the thick portion 30, which is difficult to be deformed, is brought into contact with the end portion 12b of the second inner ring 12, whereby it is possible to prevent the inner thin portion 27 from being deformed or from being caught between the end portions 11b, 12b of the first and second inner rings. Additionally, even when the inter-inner ring seal 22 is attempted to be mounted on the inner rings with a center of the inter-inner ring seal 22 deviating from a center of the inner rings, since the inner rings move towards the center of the inter-inner ring seal 22 by following the thick portion 30 which constitutes a first member that comes into contact with the inner rings, a load exerted on the inner thin portion 27 can be mitigated in mounting the inter-inner ring seal 22 on the inner rings.

In mounting the inter-inner ring seal 22 in the rolling bearing 10, normally, the inter-inner ring seal 22 is fitted on the second circumferential surface 18b provided on the second inner ring 12, whereafter the first circumferential surface 18b provided on the first inner ring 11 is fitted in the inter-inner ring seal 22 so that the end portion 11b of the first inner ring 11 and the end portion 12b of the second inner ring 12 abut against each other.

In addition, in the inter-inner ring seal 22, a sum of circumferential lengths C of the inner thin portions 27 of the recess portion forming areas 31 is longer than a sum of circumferential lengths D of the thick portions 30 of the non-recess portion forming areas 32. As this occurs, when a negative pressure is generated inside the annular space 19, the sliding contact lips 26a are allowed to easily separate from the second circumferential surface 18b of the annular groove 18, and thus, the inter-inner ring seal 22 is more suitable for eliminating a negative pressure inside the annular space 19.

When comparing the sum of the circumferential lengths C of the inner thin portions 27 with the sum of circumferential lengths D of the thick portions 30, circumferential lengths of the areas that lie radially equidistant from an axis (denoted by P in FIG. 4) of the extending portion 26 are measured for comparison.

Second Embodiment

Figure 5:
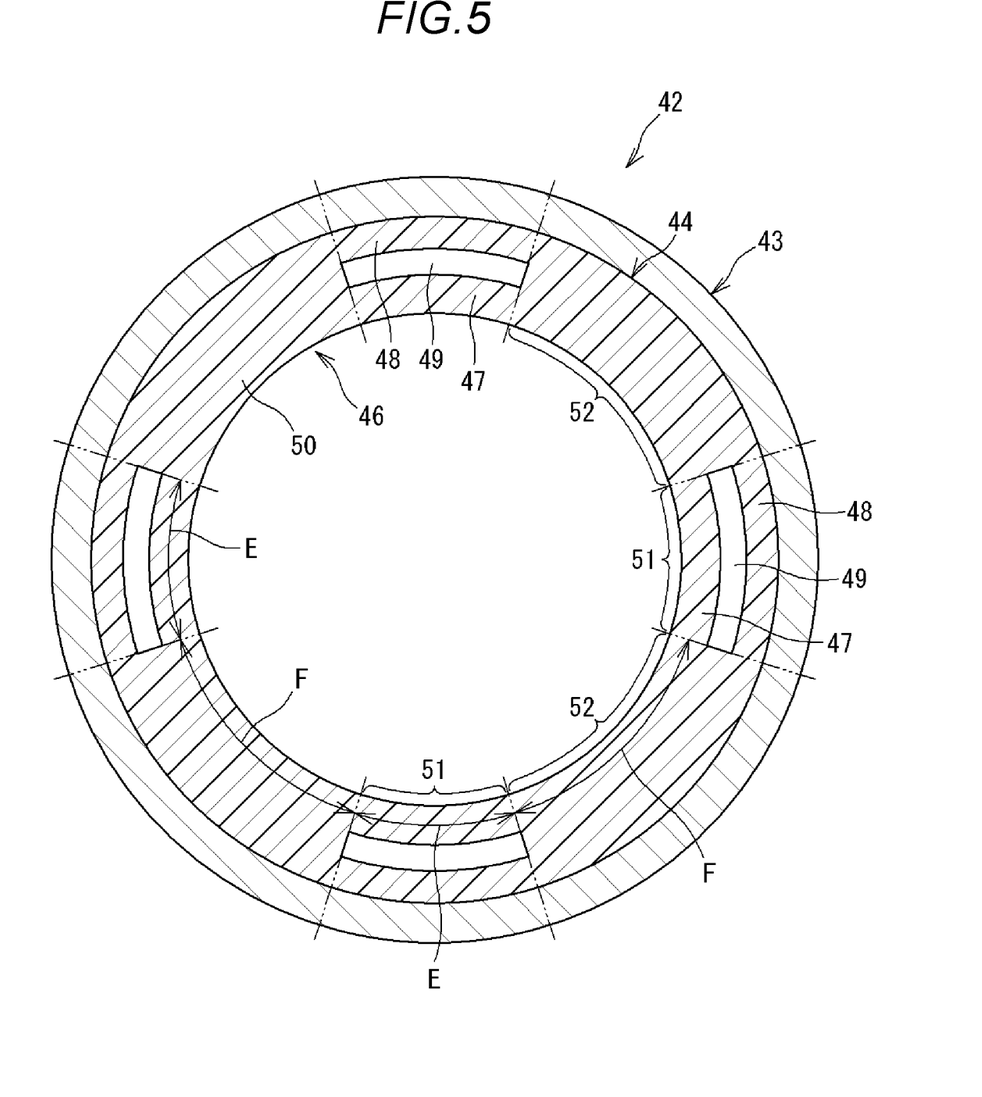
FIG. 5 is an end view of a seal member according to a second embodiment.

In this embodiment, an inter-inner ring seal 42 differs from that of the first embodiment.

FIG. 5 is an end face of a seal member of a second embodiment.

The inter-inner ring seal 42 of this embodiment has a core metal 43 and an annular elastic portion 44 that is fixed to the core metal 43 and is formed of an elastic material. The configuration of the core metal 43 is similar to that of the core metal 23 of the first embodiment.

The elastic portion 44 includes an annular proximal end portion and an annular extending portion 46 that extends from the proximal end portion. A recess portion forming area 51 and a non-recess portion forming area 52 are disposed alternately along a circumferential direction on the extending portion 46. The configuration of the elastic portion 44 is similar to that of the elastic portion 24 of the first embodiment excluding the numbers of recess portion forming areas 51 and non-recess portion forming areas 52 and circumferential lengths of the recess portion forming area 51 and the non-recess portion forming area 52 on the extending portion 46, which are different from those of the extending portion 26 of the first embodiment.

As FIG. 5 illustrates, four recess portion forming areas 51, which each have an inner thin portion 47, an outer thin portion 48 and a recess portion 49 held by the inner and outer thin portions, and four non-recess portion forming areas 52, which are each made up of a thin portion 50 as a whole, are disposed alternately on the extending portion 46.

The inter-inner ring seal 42, which is configured in the way described above, can eliminate a negative pressure inside an annular space 19 of a rolling bearing 10 by the existence of the recess portion forming areas 51. The inter-inner ring seal 42 can be superior in relation to assemblage into the rolling bearing 10 by the existence of the non-recess portion forming areas 52.

Additionally, an extent to which the thick portion 30 projects towards the other axial end side is controlled so that an axial width L2 of the inter-inner ring seal 22 becomes equal to or smaller than a width L1 of an annular groove 18. When the width L2 is greater than the width L1, a gap is generated in the abutting plane to which the inter-inner ring seal 22 is mounted in the annular groove 18, between the first inner ring 11 and the second inner ring 12, and there are fears that a foreign matter enters a bearing interior portion from the gap. Consequently, to avoid a risk of such a foreign matter entering the bearing interior portion, it is preferable that the width L2 is equal to or smaller than the width L1.

In the inter-inner ring seal 42, a sum of circumferential lengths E of the inner thin portions 47 of the recess forming areas 51 is shorter than a sum of circumferential lengths F of the thick portions 50 of the non-recess portion forming areas 51. Due to this, in mounting the inter-inner ring seal 42 in the rolling bearing 10, compared with the inter-inner ring seal 22, the inter-inner ring seal 42 is difficult to be deformed, and hence, the inter-inner ring seal 42 is superior to the inter-inner ring seal 22 in relation to assemblage into the rolling bearing 10.

Additionally, in this embodiment, the distal end portion 30a of the thick portion 30 projects, and this projecting portion can function as a stopper when mounting the inter-inner ring seal 22 on the inner rings. Therefore, the assembling work can be performed easily.

Even though the distal end face 30a1 of the distal end portion 30a of the thick portion 30 is brought into abutment with the other axial end side of the annular groove 18 as a result of the inter-inner ring seal 22 moving towards the other axial end side (towards the right in FIG. 2), an air passage between a bearing exterior portion and the bearing interior portion is ensured by the existence of the recess portion forming areas (refer to FIG. 2).

Figure 6:
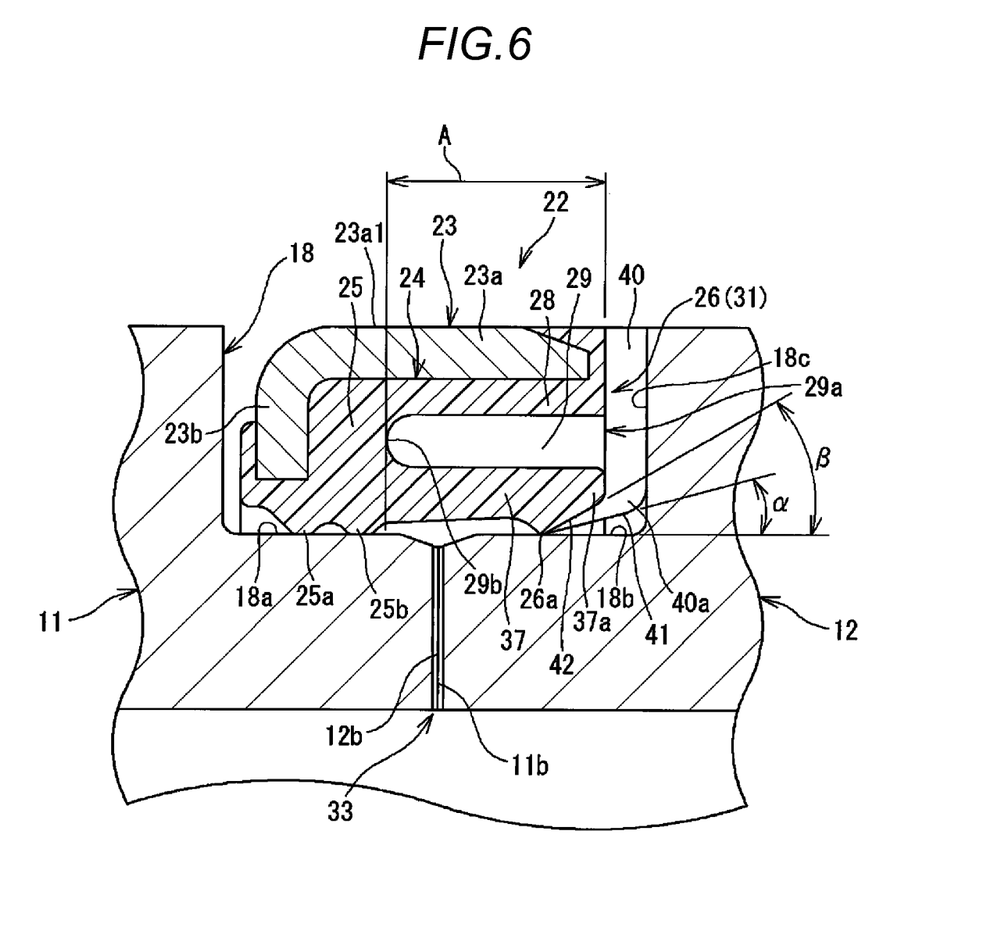
FIG. 6 is a sectional view of a seal member according to a further embodiment.

FIG. 6 is a sectional view of a seal member according to a further embodiment of the invention and illustrates a section corresponding to the section illustrated in FIG. 2 in relation to the embodiment illustrated in FIGS. 1 to 4. In FIG. 6, like reference numerals will be given to like configurations to the configurations of the embodiment illustrated in FIGS. 1 to 4, and the description thereof will be omitted for the sake of simplicity.

A distal end portion 40a of a thick portion 40 in an embodiment illustrated in FIG. 6 has at a radially inner portion of the distal end portion 40a a first sloping surface 41 that separates farther away from a second circumferential surface 18b that constitutes a bottom surface of an annular groove 18 as the first sloping surface 41 extends towards the other axial end side. Additionally, a distal end portion 37a of an inner thin portion 37 has at a radially inner portion of the distal end portion 37a a second sloping surface 42 that separates farther away from the second circumferential surface 18b that constitutes the bottom surface of the annular groove 18 as the second sloping surface 42 extends towards the other axial end side. An angle $\alpha$ formed by the first sloping surface 41 and the second circumferential surface 18b of the annular groove 18 is smaller than an angle $\beta$ formed by the second sloping surface 42 and the second circumferential surface 18b of the annular groove 18. In the embodiment illustrated in FIG. 6, the angle $\alpha$ is set at almost a half of the angle $\beta$. In this way, when the angle $\alpha$ formed by the first sloping surface 41 of the distal end portion 40a of the thick portion 40 and the second circumferential surface 18b of the annular groove 18 is smaller than the angle $\beta$ formed by the second sloping surface 42 of the distal end portion 37a of the inner thin portion 37 and the second circumferential surface 18b of the annular groove 18, in mounting an inter-inner ring seal 22 on end portions of an inner rings of a rolling bearing, the first sloping surface 41 of the distal end portion 40a of the thick portion 40 comes into contact with the end portions of the inner rings before the second sloping surface 42 of the distal end portion 37a of the inner thin portion 37 comes into contact with the end portions of the inner rings and functions as a guide when the inter-inner ring seal 22 is mounted on the end portions of the inner rings. Thus, the inter-inner ring seal 22 can be mounted more smoothly on the end portions of the inner rings of the rolling bearing.

Additionally, the first sloping surface 41 of the distal end portion 40a of the thick portion 40 also functions to center the inner rings when the inter-inner ring seal 22 is mounted on the end portions of the inner rings of the rolling bearing. Namely, even though the inter-inner ring seal 22 is attempted to be mounted on the end portions of the inner rings in such a state that a center of the inner rings deviates from a center of the inter-inner ring seal 22, the inner rings come into contact with the first sloping surface 41 to move along the first sloping surface 41, whereby the center of the inner rings comes to coincide with the center off the inter-inner ring seal 22.

Other Embodiments

The invention is not limited to the embodiments that have been described heretofore but can be carried out by being modified as required. In the seal members (the inter-inner ring seals) of the first and second embodiments, the recess portion forming areas and the non-recess portion forming areas are both disposed at equal intervals along the circumferential direction. However, in a seal member of an embodiment of the invention, recess portion forming areas and non-recess portion forming areas do not necessarily have to be disposed at equal intervals.

Additionally, all the circumferential lengths of the recess portion forming areas do not have to be the same, and hence, recess portion forming areas may have circumferential lengths that differ from one another. Then, all the circumferential lengths of the non-recess portion forming areas do not have to be the same, and hence, non-recess portion forming areas may have circumferential lengths that differ from one another.

Further, the numbers of recess portion forming areas and non-recess portion forming areas are not limited, and hence, at least one recess portion forming area and one non-recess portion forming area should be provided.

The arrangements, circumferential lengths and numbers of these recess portion forming areas and non-recess portion forming areas should each be selected as required in consideration of ease at which a negative pressure in the interior of the rolling bearing is eliminated and assemblage of the seal member into the rolling bearing.

In the seal members of the first and second embodiments, the two fixing lips are provided on the inner circumferential surface of the proximal end portion. However, in a seal member of this embodiment, the fixing limp may be provided one or three or more.

In the embodiment described above, the angle α formed by the first sloping surface of the distal end portion of the thick portion and the second circumferential surface of the annular groove is smaller than the angle β formed by the second sloping surface of the distal end portion of the inner thin portion and the second circumferential surface of the annular groove. However, even in the case where the angle α=the angle β, almost the same advantageous effect as the advantageous effect provided when the angle α is smaller than the angle β can be provided.

The rolling bearing used in the embodiments of the invention is not limited to the rolling bearing used to support the roll neck of the rolling roll and hence may be rolling bearings used to other devices (applications).

DESCRIPTION OF REFERENCE NUMERALS

1: Rolling bearing assembly; 2: Roll neck (Rotational shaft); 10: Rolling bearing; 11: First inner ring; 12: Second inner ring; 13: First outer ring; 14: Second outer ring; 15: Third outer ring; 16: Tapered roller; 17: Cage; 18: Annular groove; 18a: First circumferential surface; 18b: Second circumferential surface; 19: Annular space; 20: Seal member; 21: Bearing seal (Seal member); 22, 42: Inter-inner ring seal (Seal member); 23, 43: Core metal; 24, 44: Elastic portion; 25: Proximal end portion; 26, 46: Extending portion; 26a: Sliding contact lip; 27, 37, 47: Inner thin portion; 28, 48: Outer thin portion; 29, 49: Recess portion; 30, 40, 50: Thick portion; 31, 51: Recess portion forming area; 32, 52: Non-recess portion forming area; 33: Through hole; 41: First sloping surface; 42: Second sloping surface.

The invention claimed is:

1. A seal member for a rolling bearing, the rolling bearing having a pair of inner rings fitted on a rotational shaft in such a state that axial end portions abut against each other, an outer ring disposed radially outwards of the pair of inner rings, and an annular groove provided on an outer circumference of a portion where the end portions of the pair of inner rings abut against each other,
    wherein the seal member comprises an annular elastic portion made of an elastic material,
    wherein the seal member is mounted in the annular groove,
    wherein the elastic portion includes:
        an annular proximal end portion that is fixed to one axial end side of the annular groove; and
        an annular extending portion extending from the proximal end portion towards another axial end side of the annular groove, and having on an inner circumference thereof a sliding contact lip configured to be brought into sliding contact with the other axial end side of the annular groove,
    wherein the extending portion includes:
        a thin portion whose radial thickness is smaller than that of the proximal end portion along a circumferential direction, and which deforms radially outwards by virtue of a negative pressure generated in an interior of the rolling bearing to possibly cause the sliding contact lip to separate from the annular groove; and
        a thick portion whose radial thickness is greater than that of the thin portion, and
        wherein the thin portion and the thick portion are disposed alternately.

2. The seal member for a rolling bearing according to claim 1, wherein the extending portion has a recess portion that opens at the other axial end side and whose depth direction follows an axial direction, and
    wherein the thin portion is provided radially inwards of the recess portion.

3. The seal member for a rolling bearing according to claim 1, wherein a sum of circumferential lengths of the thin portion is longer than a sum of circumferential lengths of the thick portion.

4. The seal member for a rolling bearing according to claim 1, wherein a sum of circumferential lengths of the thin portion is shorter than a sum of circumferential lengths of the thick portion.

5. The seal member for a rolling bearing according to claim 1, wherein a boundary portion between the thin portion and the proximal end portion is situated nearer to the one axial end side than an abutting plane where the end portions of the pair of inner rings abut against each other.

6. The seal member for a rolling bearing according to claim 1, wherein a distal end portion of the thick portion on the other axial end side projects further towards the other axial end side than a distal end portion of the thin portion on the other axial end side.

7. The seal member for a rolling bearing according to claim 6, wherein the distal end portion of the thick portion has a first sloping surface that comes to separate farther away from a bottom surface of the annular groove as the first sloping surface extends towards the other axial end side on a radially inner portion of the distal end portion,
    wherein the distal end portion of the thin portion has a second sloping surface that comes to separate farther away from the bottom surface of the annular groove as the second sloping surface extends towards the other axial end side on a radially inner portion of the distal end portion, and
    wherein an angle formed by the first sloping surface and the bottom surface of the annular groove is equal to or smaller than an angle formed by the second sloping surface and the bottom surface of the annular groove.

8. A rolling bearing assembly comprising:
    the rolling bearing having the pair of inner rings, the outer ring, the annular groove, and a rolling element disposed between the outer ring and the inner rings; and
    the seal member for the rolling bearing according to claim 1, wherein the pair of inner rings has a first inner ring and a second inner ring whose end portions abut against each other in an axial direction of the inner rings, wherein the annular groove is provided on an outer circumferential surface of a portion where the first inner ring and the second inner ring are caused to abut against each other, and wherein the seal member for the rolling bearing is mounted in the annular groove.

\* \* \* \* \*